United States Patent [19]

Ogawa

[11] Patent Number: 4,688,126
[45] Date of Patent: Aug. 18, 1987

[54] TAPE GUIDE ARRANGEMENT FOR HELICAL SCAN MAGNETIC RECORDING AND PLAYBACK APPARATUS

[75] Inventor: Kimio Ogawa, Yokohama, Japan
[73] Assignee: Victor Company of Japan, Limited, Yokohama, Japan
[21] Appl. No.: 691,341
[22] Filed: Jan. 14, 1985
[30] Foreign Application Priority Data
  Jan. 23, 1984 [JP] Japan ................................ 59-9701
[51] Int. Cl.⁴ ............................................ G11B 15/60
[52] U.S. Cl. ............................................ 360/130.24
[58] Field of Search ................................ 360/130.24
[56] References Cited
  U.S. PATENT DOCUMENTS
  3,955,215  5/1976  Hosoi ............................ 360/130.24
  4,257,076  3/1981  Shimizu ........................ 360/130.24

Primary Examiner—A. J. Heinz
Attorney, Agent, or Firm—Jordan and Hamburg

[57] ABSTRACT

A tape guide arrangement for a helical scan magnetic recording and playback apparatus is provided with a tape transport regulation device for causing a magnetic tape to be transported stably in a flat profile and at a constant height. A stationary lower drum coaxially and operatively associated with a rotatable upper drum, which is provided with magnetic heads, includes a stepped portion engaged by the lower edge of the tape for restricting the position of the tape with respect to height, and a tape guide portion engaged by only a limited portion of the tape adjacent to the lower end for guiding the tape along a predetermined tape transport path while maintaining the tape in a flat profile. The area over which the tape and lower drum contact and, therefore, friction therebetween is significantly reduced.

7 Claims, 9 Drawing Figures

TAPE GUIDE ARRANGEMENT FOR HELICAL SCAN MAGNETIC RECORDING AND PLAYBACK APPARATUS

BACKGROUND OF THE INVENTION

The present invention relates to a tape guide arrangement for a helical scan magnetic recording and playback apparatus which includes a stationary lower drum and a rotatable upper drum and, more particularly, to a tape guide arrangement including a stationary lower drum which is provided with a unique tape guide for smoothly guiding a magnetic tape.

In a recording and playback apparatus of the kind described, a magnetic tape is generally transported helically wrapping around a guide drum over a predetermined angular range. To implement such a manner of tape transport, a stationary lower drum of a guide drum assembly is usually provided with a tape transport guide adapted to guide a magnetic tape helically along a predetermined path.

In such a prior art tape guide arrangement, the tape transport guide is formed in part of the outer periphery of the lower drum and made up of a shoulder to be engaged by the lower edge of a running magnetic tape and a tape sliding surface to be engaged by one surface of the tape. The problem encountered with this kind of tape transport guide is that the area over which the tape surface contacts the tape sliding surface of the lower drum and, therefore, friction developing therebetween is relatively large, liable to develop unstable transport of the tape and make the tape and guide drum assembly easy to be worn out or damaged. An attempt heretofore made to solve such a problem consists in joining the shoulder and the tape sliding surface to each other by an intermediary curved surface to reduce the friction due to contact, as disclosed in Japanese Patent Laid-Open Publication No. 58-45654/1983, for example. This approach, however, brings about another problem that upon contact of the lower edge of a magnetic tape in transport with the curved surface the level, or height, of the tape is apt to fluctuate in height and fail to be maintained at a predetermined position.

SUMMARY OF THE INVENTION

It is therefore an object of the present invention to provide an improved tape guide arrangement for a magnetic recording and playback apparatus which allows a magnetic tape to be transported stably in a flat profile and at a constant height.

It is another object of the present invention to provide a tape guide arrangement for a magnetic recording and playback apparatus which is furnished with a tape transport guide capable of reducing a frictional load in the transport of a magnetic tape.

It is another object of the present invention to provide a tape guide arrangement for a magnetic recording and playback apparatus which causes a minimum of wear or damage to occur in a magnetic tape or a guide drum assembly.

It is another object of the present invention to provide a tape guide arrangement which reduces a contact area between a magnetic tape and a tape guide and, thereby, friction therebetween.

It is another object of the present invention to provide a generally improved tape guide arrangement for a magnetic recording and playback apparatus.

A tape guide arrangement installed in a magnetic recording and playback apparatus for guiding a magnetic tape being transported of the present invention comprises a rotatable drum member provided with a rotary magnetic head, and a stationary drum member coaxially and operatively associated with the rotatable drum member and provided with tape transport regulating device for guiding the tape such that the tape runs helically wrapping around the rotatable and stationary drum members over a predetermined angular range. The tape transport regulating device has a tape positioning portion for guiding the tape with one edge of the tape abutted against the tape positioning portion and positioning the tape with respect to height, and a tape guide portion comprising a tape non-contact surface portion which faces one of opposite surfaces of the tape, and a tape contact surface portion which is engaged by a part of the one surface of the tape to guide the tape along a predetermined tape transport path and holds the tape in a flat profile.

In accordance with the present invention, a tape guide arrangement for a helical scan magnetic recording and playback apparatus is provided with a tape transport regulation device for causing a magnetic tape to be transported stably in a flat profile and at a constant height. A stationary lower drum coaxially and operatively associated with a rotatable upper drum, which is provided with magnetic heads, includes a stepped portion engaged by the lower edge of the tape for restricting the position of the tape with respect to height, and a tape guide portion engaged by only a limited portion of the tape adjacent to the lower end for guiding the tape along a predetermined tape transport path while maintaining the tape in a flat profile. The area over which the tape and lower drum contact and, therefore, friction therebetween is significantly reduced.

Other objects, features and advantages of the present invention will become apparent from the following detailed description taken with the accompanying drawings.

DESCRIPTION OF THE PREFERRED EMBODIMENTS

Figure 1:
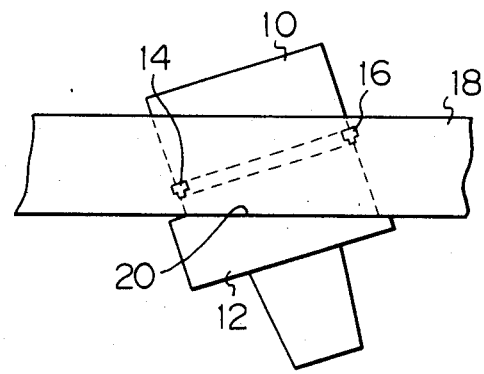
FIG. 1 is a side elevation of a prior art tape guide arrangement for a magnetic recording and playback apparatus.
Figure 2:
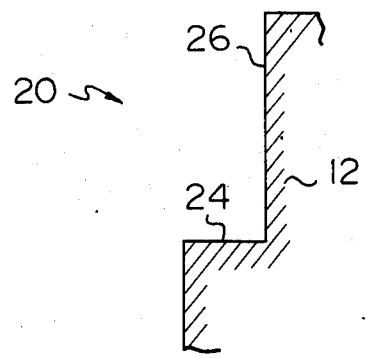
FIG. 2 is an enlarged vertical section of a tape transport guide portion of the arrangement shown in FIG. 1.

While the tape guide arrangement for a helical scan magnetic recording and playback apparatus of the present invention is susceptible of numerous physical embodiments, depending upon the environment and requirements of use, substantial numbers of the herein shown and described embodiments have been made, tested and used, and all have performed in an eminently satisfactory manner.

Before entering into detailed description of the present invention, a brief reference will be made to some examples of prior art tape guide arrangements shown in FIGS. 1–5.

Referring to FIGS. 1–5, a rotatable upper drum 10 is positioned coaxially with a stationary lower drum 12 and provided with, for example, two magnetic heads 14 and 16. Driven by a motor (not shown), the upper drum 10 rotates at a high speed (e.g. 1800 rpm) in a position above and coaxial with the lower drum 12. The lower drum 12 includes a stepped tape transport guide 20 positioned in its outer periphery for guiding a magnetic tape 18 a profile of which is shown in the figures. The tape 18 is transported in contact with the lower drum 12 over a predetermined angular range. Due to such fast rotation of the upper drum 10, an air film 22 develops between the drum 10 and the tape 18 to keep them spaced apart from each other. The tape 18 in transport is wound around the upper and lower drums 10 and 12 over a predetermined angle and regulated in level, or height, due to the abutment of its lower edge against a shoulder 24 of the guide 20, while the magnetic heads 14 and 16 rotating with the upper drum 10 record or reproduce signals into or out of the tape 18. As shown in an enlarged scale in FIG. 2, the lower drum 12 is provided with a tape sliding surface 26 having a cylindrical configuration which is substantially equal in diameter to the upper drum 10. The surface 26 extends perpendicular to the shoulder 24.

Figure 3:
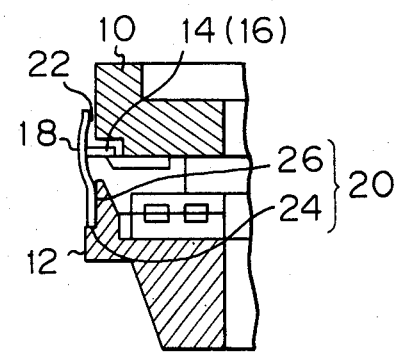
FIGS. 3 and 4 are fragmentary vertical sections each showing the arrangement of FIG. 1 in a tape guiding condition.

Now, magnetic tapes extensively used today may generally be classified into two types, i.e., a magnetic layer coated type and a deposition type. As generally known, the coated type magnetic tape is little susceptive to curling, while the deposition tape is susceptive thereto very much. The deposition type tape of which a metal magnetic material is deposited on a support in a vacuum deposition or sputtering process, compared to the coated type, has a hard surface and has rigidity in itself so that a portion thereof engaged with the tape guide arrangement is apt to wear; a wider friction area results in a larger load in the tape transport and, thereby, more critical, tape guiding and transport. Where the tape 18 comprises a coated type tape, a lower portion of the tape 18 is engaged with the tape guide 20 over substantially the whole surface 26 of the latter, as shown in FIG. 3. Even in case of a curly deposition type tape loaded in place of the tape 18 of FIG. 3, the contact area between the tape 18 and the surface 26 of the tape guide 20 is still large although somewhat smaller than the case with the coated type tape.

Figure 5:
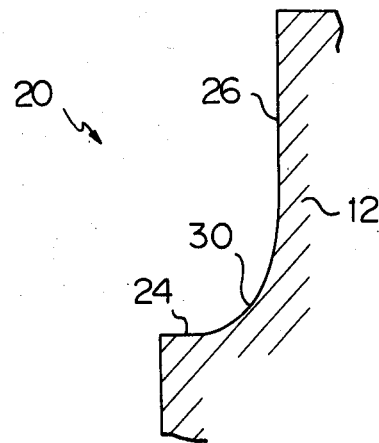
FIG. 5 is an enlarged vertical section of another prior art tape guide arrangement for a magnetic recording and playback apparatus.
Figure 6:
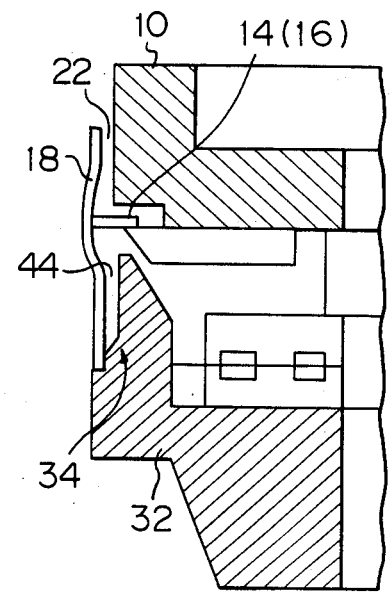
FIG. 6 is fragmentary vertical section of a tape guide arrangement for a magnetic recording and playback apparatus embodying the present invention which is shown in a tape guiding condition.
Figure 7:
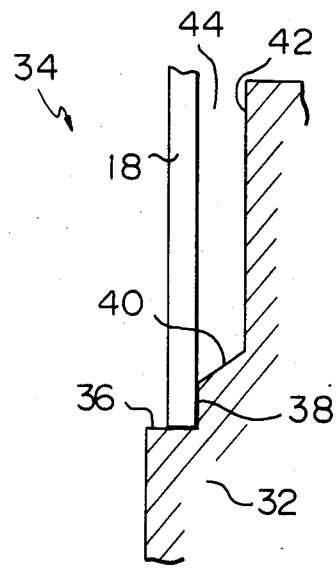
FIG. 7 is fragmentary enlarged view of the arrangement shown in FIG. 6.

The tape guide arrangement disclosed in Japanese Patent Laid-Open Publication No. 58-45654/1983 as previously mentioned is another example of prior art arrangements and shown in FIG. 5. In FIG. 5, the shoulder 24 and the tape sliding surface 26 joins each other through an intermediary curved portion 30. In this construction, an air gap developed by the air film 22 between the upper drum 10 and the tape 18 due to the fast rotation of the drum 10 is also communicated to a gap between the lower drum 12 and the tape 18 for the purpose of allowing the tape 18 to run at a spacing from the surface 26 and, thereby, reducing frictional resistance exerted by the surface 26.

In the prior art arrangement shown in FIGS. 1–4, the contact area between the tape 18 and the surface 26 is relatively large and, in turn, entails substantial friction which is detrimental to the stability of tape transport. Especially, where use is made of a deposition type tape, the rigidity and surface hardness particular thereto promotes were of those portions of the lower drum 12 which make contact with the tape, while causing damage to the tape itself. Meanwhile, the prior art arrangement shown in FIG. 5 is not fully acceptable because the height of the tape 18 fluctuates as its lower edge is brought into contact with the curved portion 30 between the shoulder 24 and the surface 26.

Reference will be made to FIGS. 6–9 for describing the present invention in detail. In FIGS. 6–9, the same or similar structural elements as those of FIGS. 1–5 are designated by like reference numerals and detailed description thereof will be omitted for simplicity.

Figure 4:
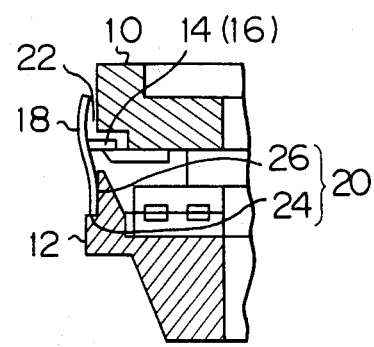

In FIGS. 3, 4 and 5, although the tape 18 is shown in an exaggerated profile which is bulged as being momentarily pressed by the head 14 (16), such bulge develops only at a moment of the head contact so that the profile of the tape 18 is subject generally to the upper and lower drum surfaces in the predetermined angular range.

A lower drum 32 is provided with a tape transport guide 34 which plays an essential role in the tape guide arrangement of the present invention. As shown in an enlarged scale in FIG. 7, the tape transport guide 34 comprises a stepped portion 36, a tape guide portion 38, an inclined portion 40, and a tape transport surface portion 42. The stepped portion, or shoulder, 36 guides a magnetic tape 18 in transport while being engaged by the lower edge of the tape 18 to restrict the height of the latter. Having a cylindrical configuration, the tape guide portion 38 guides the tape 18 while being engaged by only limited part of one of opposite surfaces of the tape 18 which is adjacent to the lower edge. The tape guide portion 38 rises from the shoulder 36 to a height such as 0.2–0.3 millimeter for a 12.7 millimeter wide tape which suffices for tape transport guide and, yet, allows a minimum of friction to develop between the tape 18 and the portion 38. The shoulder 36 and the tape guide portion 38 extend perpendicular to each other. The tape transport surface portion 42 has a cylindrical configuration whose outside diameter is substantially the same as or slightly smaller than that of an upper drum 10. The outside diameter of the tape guide portion 38 is slightly larger than that of the upper drum 10, the difference being complementary to the thickness of an air film 22 which is, for example 0–20 microns depending on the angular position in the predetermined angular range.

The tape 18 in transport remains in abutment against the shoulder 36 at its lower edge and contacts the tape guide portion 38 over limited part of its surface which is adjacent to the lower edge. Because the outside diameter of the tape transport surface portion 42 is smaller than that of the tape guide portion 38, an air gap 44 is defined between the tape 18 and the tape transport surface portion 42 to allow the tape 18 to run without contacting the surface portion 42 or under a light load. Friction of the tape 18, therefore, develops but is limited to portions only between the lower edge of the tape 18 and the shoulder 36 and between the limited area of the tape 18 adjacent to the tape lower edge and the guide portion 38. The result is only a small magnitude of friction and, therefore, a light load in tape transport which insures smooth movement of the tape, thus minimizing a load to the tape transport system as well as wear of the drum even with the deposition tape, which has substantial rigidity as previously stated.

Figure 8:
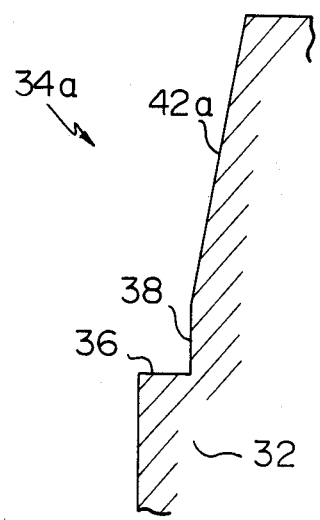
FIGS. 8 and 9 are enlarged vertical sections each showing a modification to a tape transport guide portion of the tape guide arrangement in accordance with the present invention.
Figure 9:
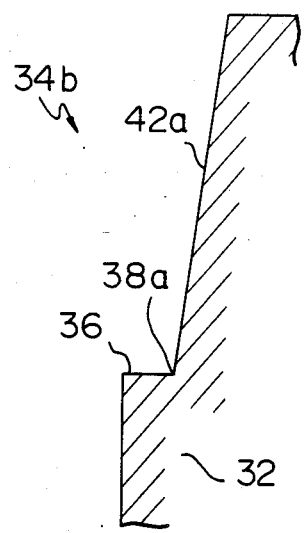

Alternative configurations of the tape transport guide 34 are shown in FIGS. 8 and 9. A tape transport guide 34a of FIG. 8 includes a tape transport surface portion 42a which is inclined. On the other hand, a tape transport guide 34b of FIG. 9 includes a tape guide portion 38a which is dimensioned as short as possible to constitute a point where the shoulder 36 meets the tape transport surface portion 42a.

In summary, it will be seen that the present invention provides a tape guide arrangement for a magnetic recording and playback apparatus which reduces the contact area between a tape guide portion and a magnetic tape to minimum one which suffices for holding a tape in position for transport, thereby reducing the friction between the interengaged surfaces and, thereby, the load in tape transport. Such is also effective to lessen the chance of damage to the tape and lower drum. Because the tape runs in a relatively flat profile, it is held in contact with magnetic heads in a desirable manner. Further, because the outside diameter of the tape guide portion is slightly larger than that of the upper drum, a portion of the tape adjacent to the lower end and guided by the tape guide portion is kept aligned with an upper portion of the tape which is spaced from the upper drum by an air film developed by the rotation of the upper drum. This further enhances the transport of the tape in a flat profile and, thereby, the desirable contact of the tape with the heads.

Various modifications will become possible for those skilled in the art after receiving the teachings of the present disclosure without departing from the scope thereof.

What is claimed is:

1. A tape guide arrangement installed in a magnetic recording and playback apparatus for guiding a magnetic tape being transported, comprising:
   a rotatable drum member provided with a rotary magnetic head; and
   a stationary drum member coaxially and operatively associated with said rotatable drum member and provided with tape transport regulating means for guiding the tape such that the tape runs helically wrapping around the rotatable and stationary drum members over a predetermined angular range;
   said tape transport regulating means having tape positioning means for guiding the tape and positioning the tape with respect to height, said tape positioning means comprising a stepped portion including an abutment surface which extends parallel to the tape transport direction and which abuts one edge of the tape, and tape guide means comprising a tape non-contact surface portion which faces a surface of the tape and which extends in a transverse direction of the tape, said tape non-contact surface portion being spaced from the surface of the tape to define an air gap therebetween, a tape contact surface portion which is disposed adjacent to said tape positioning means and is engaged by a part of said surface of the tape to guide the tape along a predetermined tape transport path and to hold the tape in a flat profile, said tape contact surface portion being substantially shorter along said transverse direction than that of the tape non-contact surface portion, both the tape contact surface portion and the tape non-contact surface portion being perpendicular to the abutment surface of the stepped portion, said tape guide means further comprising an inclined surface portion which joins the tape contact surface portion and the tape non-contact portion to each other, said inclined surface being inclined relative to said tape contact surface.

2. A tape guide arrangement as claimed in claim 1, wherein the tape non-contact surface portion of the stationary drum member is substantially equal in diameter to the rotatable drum member.

3. A tape guide arrangement as claimed in claim 1, wherein the tape non-contact surface portion of the stationary drum member is smaller in diameter than the rotatable drum member.

4. A tape guide arrangement as claimed in claim 1, wherein the tape contact surface portion of the stationary drum member is larger in diameter than the rotatable drum member.

5. A tape guide arrangement as claimed claim 1, wherein said tape guide means has a single guide surface for guiding the surface of the tape, said single guide surface being defined by said tape contact surface portion, whereby friction between the surface of the tape and the tape guide means is minimized.

6. A tape guide arrangement as claimed in claim 1, wherein said tape contact surface portion has a circular configuration with a diameter, said rotatable drum having a circular configuration with a diameter, said tape having a lower portion and an upper portion, wherein the diameter of said tape contact surface portion is greater than the diameter of said rotatable drum, the lower portion of the tape which is guided by said tape contact surface portion being kept aligned with the upper portion of the tape such that said upper portion of said tape is thereby spaced from the rotatable drum by an air film developed by the rotation of the upper drum.

7. A tape guide arrangement as claimed in claim 1, wherein the air gap is defined by the tape, the inclined surface portion and the tape non-contact surface portion.

* * * * *